UNITED STATES PATENT OFFICE.

JOHN BROWN FRANCIS HERRESHOFF, OF BROOKLYN, NEW YORK, ASSIGNOR TO HIMSELF, GEORGE H. NICHOLS, AND WILLIAM H. NICHOLS, ALL OF SAME PLACE.

SULPHURIC-ACID TOWER.

SPECIFICATION forming part of Letters Patent No. 335,699, dated February 9, 1886.

Application filed October 17, 1885. Serial No. 180,163. (No model.)

*To all whom it may concern:*

Be it known that I, JOHN BROWN FRANCIS HERRESHOFF, a resident of Brooklyn, in the county of Kings and State of New York, have invented an Improved Sulphuric-Acid Tower, of which the following is a full, clear, and exact description, reference being made to the accompanying drawings, in which—

Figure 1 is a sectional elevation of my improved sulphuric-acid tower. Fig. 2 is a horizontal section of the same on the line $c\ c$, Fig. 1. Fig. 3 is a horizontal section of the same on the line $k\ k$, Fig. 1.

This invention relates to a new construction of sulphuric-acid tower, having for its object the obviating of difficulties that are connected with the Glover tower, now generally used. The Glover tower, of which a complete description can be found in the book entitled "A Theoretical and Practical Treatise on the Manufacture of Sulphuric Acid and Alkali with the Collateral Branches," by George Lunge, Ph. D., F. C. S., London, 1879, Vol. 1, page 426, is a brick-lined structure containing blocks of flint and coke or other acid-resisting material. The hot gases from the kiln enter the tower near the bottom and pass out near the top, being cooled on their way up by the blocks of flint, with which they are brought in contact. The tower is, however, also used for the purpose of concentrating the product-of-chamber acid up to 60° Baumé and above, said acid being introduced at the top of the tower and allowed to trickle through the filling thereof. Water contained in the acid will be evaporated by the heat which is brought into the tower through the introduction of the gas. The main difficulty connected with the use of the Glover tower is, however, caused by the brick lining and by the lower brick arches, which support the filling; for, although the text-books say that the bricks should be acid-resisting bricks, the fact is that no bricks have ever been made that can withstand the severe action of the hot acid gases and of the hot acid which is introduced into such towers. As a consequence, the brick walls are gradually eaten away, which greatly shortens the life of the tower, and which, moreover, renders the acid that is passed through the tower impure, in that the bricks yield their own elements up to the acid that corrodes them; hence, the sulphuric acid passed through such a Glover tower can only be used for a few purposes, because of its impurities. Again, the acid-absorbing iron and alumina from the brick of the Glover tower deposit a white scale of anhydrous sulphate of iron and alumina above the open arch of the tower, and thereby gradually stop up the openings, check the draft, and finally interfere effectually with the proper passage of the gas and acid through the tower. It is costly and difficult to properly clean out these deposits. When the bricks are more or less corroded by the acid, it happens at times that the tower will tumble in, thus causing stoppage of the whole acid plant, and a very serious loss of time, &c.

My present invention seeks, as heretofore stated, to obviate these difficulties; and it consists, principally, in lining the entire tower within its outer sheathing of lead with quartz, glass, or other perfect acid-resisting material, in such manner as to prevent the acid reaching said lead sheathing, which, if reached, would be corroded.

The invention also consists in constructing the lower part of the tower entirely of quartz or its equivalent, as hereinafter more fully stated.

The improved tower has, like the towers now in use, an outer sheathing or casing, A, of lead. The body of the tower is either of cylindrical form or of prismatic form. Figs. 2 and 3 represent it of the last-mentioned form. This casing or sheathing, A, of lead in my improved tower should be so constructed as to resist a heavy pressure from within, and yet at the same time it should not in the least bulge outwardly. To prevent this bulging outwardly, the whole outer surface of the lead casing or sheathing is inclosed in a resisting-wall, B, of iron, which is constructed of series of strong iron plates $a\ a$, that are bolted at their ends to the upright posts $b\ b$ of the tower. These posts are by preference also made of iron.

acid-resisting material, and with the lead sheathing A and outer wall, B, all arranged to maintain the loose lining D in position, as specified.

3. The combination of the central filling, C, with the layer d, of coarsely-ground quartz, and the outer layer, e, of finely-ground quartz, and with the sheathing A, substantially as herein shown and described.

4. In a sulphuric-acid tower, the combination of the quartz posts E and upper blocks, G and H, of quartz, with the quartz filling C, all contained within the sheathing A, as specified.

JOHN BROWN FRANCIS HERRESHOFF.

Witnesses:
CHARLES G. M. THOMAS,
HARRY M. TURK.

(No Model.)
J. HESSLER.
REED BOARD.
No. 335,700. Patented Feb. 9, 1886.
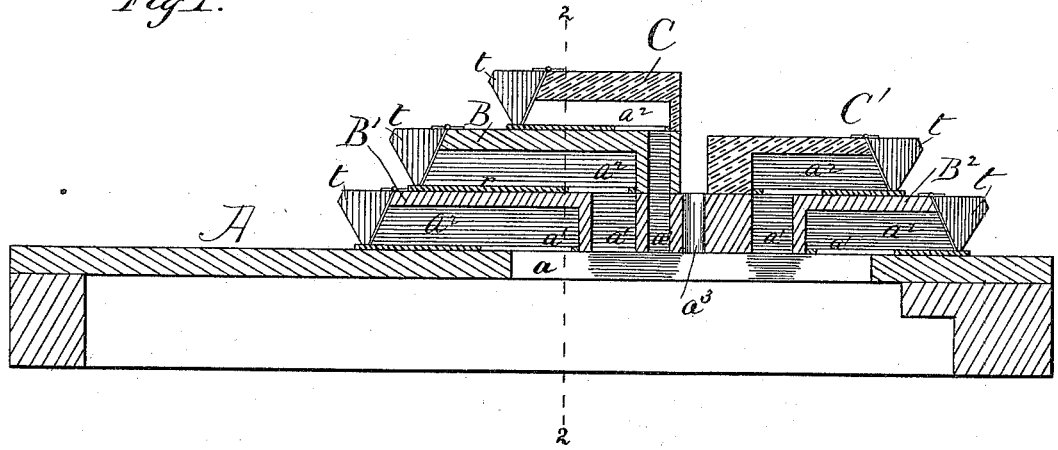
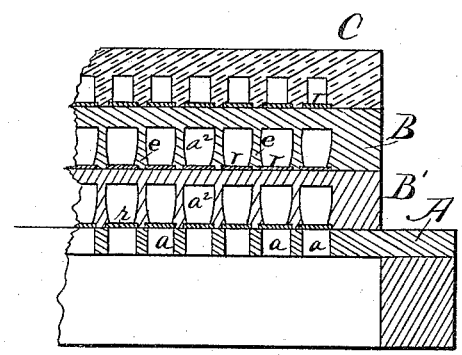
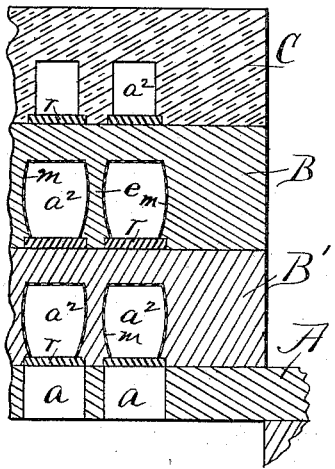
Witnesses:
Taylor E. Brown
Lew. E. Curtis
Inventor:
Jacob Hessler
By Munday, Evarts & Adcock
his Attorneys